United States Patent

Fukumochi et al.

Patent Number: 5,289,375
Date of Patent: Feb. 22, 1994

[54] TRANSLATION MACHINE

[75] Inventors: Yoji Fukumochi, Ikoma; Hitoshi Suzuki, Nara; Shuzo Kugimiya, Nara; Ichiko Sata, Nara; Tokuyuki Hirai, Yamato-Koriyama, all of Japan

[73] Assignee: Sharp Kabushiki Kaisha, Osaka, Japan

[21] Appl. No.: 641,738

[22] Filed: Jan. 15, 1991

[30] Foreign Application Priority Data

| Jan. 22, 1990 | [JP] | Japan | 1-2146 |
| Jan. 22, 1990 | [JP] | Japan | 1-2147 |
| Jan. 26, 1990 | [JP] | Japan | 1-7116 |

[51] Int. Cl.[5] .................. G06F 15/38; G06G 7/60
[52] U.S. Cl. .................................... 364/419.02
[58] Field of Search .................... 364/419, 226.4

[56] References Cited

U.S. PATENT DOCUMENTS

| 4,661,924 | 4/1987 | Okamoto et al. | 364/900 |
| 4,706,212 | 11/1987 | Toma | 364/900 |
| 4,791,587 | 12/1988 | Doi | 364/900 |
| 4,814,988 | 3/1989 | Shiotani et al. | 364/419 |
| 4,821,230 | 4/1989 | Kumano et al. | 364/900 |
| 4,887,212 | 12/1989 | Zamora et al. | 364/419 |
| 4,931,936 | 6/1990 | Kugimiya et al. | 364/419 |
| 4,953,088 | 8/1990 | Suzuki et al. | 364/419 |
| 4,962,452 | 10/1990 | Nogami et al. | 364/419 |

FOREIGN PATENT DOCUMENTS

| 0266001 | of 0000 | European Pat. Off. |
| 0274281 | of 0000 | European Pat. Off. |
| 0403057 | 12/1990 | European Pat. Off. |
| 57-69362 | 4/1982 | Japan |
| 61-18074 | 1/1986 | Japan |
| 61-74069 | 4/1986 | Japan |
| 62-271057 | 11/1987 | Japan |
| 63-221475 | 9/1988 | Japan |
| 1-166258 | 6/1989 | Japan |
| 1-233560 | 6/1989 | Japan |
| 2211639 | of 0000 | United Kingdom |
| 2211640 | of 0000 | United Kingdom |

*Primary Examiner*—Donald E. McElheny, Jr.
*Assistant Examiner*—Laura Brutman
*Attorney, Agent, or Firm*—Nixon & Vanderhye

[57] ABSTRACT

A translation machine having a storing unit for storing information of words and grammer rules, the translation machine being capable of translating sentences described in a source language into a target language includes a unit for dividing input sentence described in the source language into morphologic elements and for generating a mark-inserted sentence by adding a mark which represents an information of the detected morphologic elements, a unit connected to the dividing unit for analyzing a syntax of the morphologic elements in accordance with the information stored in the storing unit, and a unit connected to the analyzing unit for converting a structure of the syntax obtained in the dividing unit into a structure of syntax in the target language so that translated sentence is generated on a basis of the syntax structure in the target language obtained by the converting unit.

9 Claims, 12 Drawing Sheets

Fig. 6

| | 《ENGLISH》 | 《JAPANESE》 PART-OF-SPEECH CANDIDATE [manufacturing] |
|---|---|---|
| 1 | The importance of strategies. | |
| 2 | the implemementation of | VERB |
| 3 | *170_manufacturing strategies | VERB(PRESENT PARTICIPLE) |
| 4 | | VERB(GERUND) |
| 5 | | VERB(ADJECTIVE USE)/ADJECTIVE |
| | | NOUN |

Fig. 7

| | 《ENGLISH》 | 《JAPANESE》 |
|---|---|---|
| 1 | The importance of strategies. | |
| 2 | the implementation of n_manufacturing strategies | |
| 3 | | |
| 4 | | |
| 5 | | |

TRANSLATION MACHINE

BACKGROUND OF THE INVENTION

1. Field of the Invention

The present invention relates to a translation machine which is capable of generating a natural translated sentence. More particularly, the invention relates to the translation machine which is capable of translating an input sentence in accordance with a sentence pattern of the input sentence by an interaction with an operator.

2. Description of the Related Art

The inventors of the present invention know that there have been traditionally proposed some translation machines. A known translation machine mainly includes a CPU, a translation module, and storage units for storing a main dictionary, a user dictionary, grammatical rules and tree-structure converting rules. In operation, the above-mentioned translation machine is adapted to input a sentence described in a source language from a keyboard into a translation module under the control of the CPU and to translate the sentence described in the source language into a sentence described in a target language in the translation module using the main and user dictionaries and the grammatical and tree-structure converting rules.

In executing the translation from English to Japanese, for example, the above-mentioned translation module serves to divide the input sentence described in English word by word and to obtain grammatical information such as a Japanese equivalent to each word or a part of speech of the Japanese equivalent by consulting the dictionaries stored in the storage unit. If the subject word has two or more parts of speech, the Japanese equivalent matching to each part of speech can be output. As such, in translating the English sentence into a Japanese equivalent, the above-mentioned translation module generates two or more Japanese equivalent candidates on a basis of the part of speech obtained by consulting the dictionaries. It results in that the English sentence is ambiguously interpreted.

For example, when the English sentence "Time flies like an arrow" is input, some Japanese equivalents are provided depending on the interpretation of the part of speech of each word. That is, "Time" may be interpreted as a noun or a verb, "flies" may be interpreted as a noun or a verb, "like" may be interpreted as a noun or a preposition. The resulting Japanese equivalents are as follows:

1. " "(ya-no-youna-jikan-bae) (meaning that "arrow-analogous flies (insects) called as time")
2. " "(ya-no-youni-hae-wo-hakare) (meaning that "Measure flies as if an arrow moves through air")
3. " "(ya-no-youna-hae-wo-hakare) (meaning that "Measure arrow-analogous flies")
4. " "(jikan-bae-wa-ya-wo-konomu) (meaning that "Flies called as time are fond of an arrow")
5. " "(jikan-wa-ya-noyouni-tobu) (meaning that "Time passes as if an arrow moves through air")

A selection of a proper Japanese equivalent from these Japanese equivalent candidates depends on an operator's judgment.

For automating this part of translation, the above-mentioned translation machine works as follows. When an English sentence is input, the above-mentioned translation module takes the steps of dividing the English sentence into words by consulting the dictionaries for each word, and storing the combination of each speech part of each English word and its Japanese equivalent in a dictionary-consulting buffer. If the English word has two or more parts of speech, two or more combinations of each part of the English word and each Japanese equivalent are stored in the dictionary-consulting buffer. Then, the next process is to read the combinations for each word out of the dictionary-consulting buffer in accordance with the predetermined rules and to generate the Japanese equivalents on a basis of the combinations. One example of those Japanese equivalents is such that;

| Input English Sentence: | Time | flies | like | an arrow. |
|---|---|---|---|---|
| Part of Speech: | Noun | Noun | Preposition | Noun |
| Japanese equivalent candidate: | " | " | | |
| | (ya-no-youna-jikan-bae) | | | |
| | (meaning that "Arrow-analogous flies (insect) called as time") | | | |

If the candidate is not proper, the operator instructs the CPU to accept or correct the part of speech for each word, thereby the accepted or the corrected part of speech is fixed. The above-mentioned translation module serves to read the part of speech for another word and to reorganize the combination of parts of speech of each word composing the English sentence by reading another part of speech for another word from the dictionary-consulting buffer. The translating process of the reorganized combination results in offering the next combination of the parts of speech of the English sentence and its Japanese equivalent candidate. The above mentioned translation module produces the operation by the interaction with the operator. The above-mentioned repeated operations result in offering a high-quality translated sentence.

However, the above-mentioned translation machine cannot grasp which word is ambiguous considering a result of an interpretation, thereby it reads one combination of a speech part of each word composing the input sentence described in English and its Japanese equivalent depending on the predetermined rules stored in the dictionary-consulting buffer, and translates based on the combination and generates the translated equivalent candidate. Then, the operator accepts or corrects the part of speech of each English word by watching the translated equivalent candidate on the CRT. It results in removing ambiguity of the input sentence in an interactive manner with the operator.

The above-mentioned translation machine is designed to remove interpretative ambiguity of an input sentence by the operator's trial and error, thereby it requires the operator to keep an interaction with the machine, and as a result, the overall process of the translation is inefficient.

Further, the above-mentioned translation machine is designed to define the syntax structure of the input sentence on a basis of the grammatical rules stored in the memory. It results in that the translation machine outputs two or more translated equivalents when the verb contained in the input sentence has two or more sentence patterns. Hence, a user has to do the annoying operation of selecting a proper translated equivalent from the output translated equivalents.

In the following part, a process of finding a title of each English (source language) word for consulting the dictionaries used for the above-mentioned translation machine will be described in detail. Normally, in the dictionaries, the title of the English word is registered in lowercase. However, the word placed at the head of the input sentence has an uppercase at the head. Hence, the word placed at the head of the input sentence may be determined not to be registered in the dictionaries. For avoiding it, before consulting the dictionaries for the sentence-head word, the uppercase placed at the head of the word is converted into the lowercase. This dictionary-consulting mode is referred to as a standard mode.

On the other hand, for a specific sentence consisting of uppercases only such as a telex description, the standard mode is not effective. Hence, for such a sentence including the uppercases in the sentence-head word as well as the other words, all the uppercases included in the sentence are converted into the lowercases before consulting the dictionaries. This dictionary-consulting mode is referred to as an uppercase mode.

The above-mentioned translation machine requires an operator to select the standard mode or the uppercase mode in accordance with the input sentence.

For setting the dictionary-consulting mode, the above-mentioned translation machine automatically sets it as the standard mode in a case that no mode is set by the operator. When the standard mode is selected by the operator, the translation machine sets it as the standard mode. When the uppercase mode is selected by the operator, the translation machine sets it as the uppercase mode.

However, an ordinary sentence has both lowercases and uppercases. For example, a proper noun often contains an uppercase. At the standard mode, therefore, the translation machine does not convert the uppercases into the lowercases except that placed at the head of the sentence. The word having an uppercase is determined not to be registered in the dictionaries only if the uppercase does not appear at the head of the sentence. As a result, disadvantageously, the translation machine outputs the original English word as its translated equivalent. It means that it is necessary to set the dictionary-consulting mode as the uppercase mode for making effective use of the contents stored in the dictionaries.

If the dictionary-consulting mode is always set to the uppercase mode, the uppercase placed at the head of a proper noun, such as the name of a person, is converted into the lowercase even though it is not desired. In this case, if the dictionaries have a translated equivalent word to the proper noun, it results in disadvantageously outputting an erroneous Japanese equivalent as described below.

Input word: Mr. Brown
Translated equivalent
Standard mode: Brown    (Shi: meaning a Japanese equivalent of "Mr.")
Uppercase mode:         (Chyairo.shi: "Chyairo" is a Japanese equivalent of a brown color)

Both of the above-mentioned disadvantages in the dictionary-consulting mode result in that the standard mode or uppercase mode is indiscriminately set without considering each word of the input sentence.

SUMMARY OF THE INVENTION

It is therefore an object of the present invention to provide a translation machine which is capable of inclusively removing interpretative ambiguity of an input sentence before doing the translation process for enhancing the efficiency of the translation process.

The object of the present invention can be achieved by a translation machine having a storing unit for storing information of words and grammar rules, the translation machine being capable of translating sentences described in a source language into a target language includes a unit for dividing input sentence described in the source language into a morphologic elements and for generating a mark-inserted sentence by adding a mark which represents an information of the detected morphologic elements, a unit connected to the dividing unit for analyzing a syntax of the morphologic elements in accordance with the information stored in the storing unit, and a unit connected to the analyzing unit for converting a structure of the syntax obtained in the dividing unit into a structure of syntax obtained in the dividing unit into a structure of syntax in the target language so that translated sentence is generated on a basis of the syntax structure in the target language obtained by the converting unit.

Preferably, the dividing unit includes a unit for detecting the morphologic elements which are functioned as two or more parts of speech among the morphologic elements, and a unit for generating a mark-inserted sentence by adding a mark which represents an information of parts of the speech of the detected morphologic elements.

More preferably, the dividing unit further includes a unit for detecting the mark-inserted morphologic elements from the mark-inserted sentence, a unit for obtaining two or more parts of the speech of the mark-inserted morphologic elements and for displaying the part of speech candidates consisting of the obtained two or more parts of the speech.

Further preferably, the dividing unit includes a unit for replacing the mark included in the mark-inserted sentence with the part of speech symbol for specifying a proper part of the speech selected from the part of speech candidates and for generating a sentence with the part of speech symbol inserted.

The analyzing unit is preferably adapted to analyze the syntax based on the sentence with the part of speech symbol generated by the generating unit.

The information preferably includes a part of speech, a tense, a person, a numeral, a translated equivalent, and a part of speech of the translated equivalent.

The source language is English and the target language is Japanese, preferably.

The translation machine according to the first aspect of the invention works as follows.

When a sentence is input into the dividing unit, the input sentence is divided into morphologic element series so as to obtain the information such as a part of speech for each element and its translated equivalent. Then, the detecting unit detects a morphologic element having two or more parts of speech from the divided morphologic elements. If such a morphologic element is detected, the mark-inserted sentence generating unit serves to add a mark representing the information about two or more parts of speech included in the detected morphologic element for generating a mark-inserted sentence.

Next, the mark-inserted morphologic element detecting unit detects the mark-inserted morphologic element from the mark-inserted sentence generated by the mark-inserted sentence generating unit. And, the part-of-speech-candidate-series displaying unit serves to seek two or more parts of speech included in the detected mark-inserted morphologic element based on the marks and display them on the display unit. the specific part of speech is selected from the speech part candidate series displayed on the display unit. The unit for generating a sentence with the part-of-speech symbol inserted therein serves to replace the mark included in the mark-inserted sentence with the part-of-speech symbol for specifying the selected part of speech, thereby generating the sentence with the part-of-speech symbol inserted thereto.

Next, the syntax analyzing unit serves to analyze the syntax of the morphologic element series based on the resulting symbol-inserted sentence. The syntax structure given by the syntax analyzing unit is converted into the target-language syntax structure in the converting unit. Based on the resulting target-language syntax structure, the translated sentence generating unit serves to generate the translated sentence.

As described above, before analyzing the syntax of the morphologic element series, the present translation machine can inclusively check the morphologic element having two or more parts of speech and the content of each part of speech. It results in being able to inclusively select the proper one of the two or more parts of speech included in the morphologic element for a short time.

It is a second object of the present invention to provide a translation machine which can provide a proper translated equivalent by specifying a sentence pattern of an input sentence.

The second object of the present invention can be achieved by a translation machine having a storing unit for storing information of words and grammar rules, the translation machine being capable of translating sentences described in a source language into a target language includes a unit for dividing input sentence described in the source language into morphologic elements, a unit connected to the dividing unit for analyzing a syntax of the morphologic elements in accordance with the information stored in the storing unit, a unit connected to the analyzing unit for converting a structure of the syntax obtained in the analyzing unit into a structure of syntax obtained in the analyzing unit into a structure of syntax in the target language, and a unit connected to the converting unit for generating a translated sentence based on the target language syntax structure obtained by the converting unit.

Preferably, the dividing unit includes a unit for adding a symbol so as to specify a sentence pattern to a word included in the input sentence described in the source language, a unit for detecting whether or not the sentence pattern symbol is added in the input sentence during a translating operation, a unit for storing a word to which the symbol is added and a sentence pattern specified by the symbol at a time when the sentence pattern symbol is detected, and a unit for defining a structure of the input sentence by referring to the content of the storage unit.

More preferably the sentence pattern detected by the symbol adding unit is selected from any one of a first pattern sentence consisting of a subject and a verb, a second pattern sentence consisting of a subject, a verb and a complement, a third pattern sentence consisting of a subject, a verb and an object, a fourth pattern sentence consisting of a subject, a verb, a direct object and indirect object, a fifth pattern sentence consisting of a subject, a verb, an object and a complement.

The storing unit is capable of storing grammatical rules regarding a plurality of sentence patterns which are preferably selected in accordance with a result of the dividing unit.

The plurality of sentence patterns include a sentence consisting of a noun phrase only, a sentence consisting of a verb phrase only, and sentence consisting of a noun and a verb phrases, preferably.

The translation machine designed according to the second aspect of the invention works as follows.

When a sentence is input to the machine, the dividing serves to analyze the input sentence into morphologic elements and to detect whether or not a sentence-pattern-specifying symbol (referred to as a sentence-pattern symbol) is included in the morphologic elements. If the symbol is detected, the word to which the symbol is added and the sentence pattern specified by the symbol are stored in a storage unit. By referencing the content of the storage unit, it is possible to define the syntax structure of the input sentence. If, therefore, the input sentence has the sentence-pattern symbol, the translation machine can output the translated equivalent defined on the sentence specified by the symbol.

As mentioned above, the present translation machine is designed to insert the sentence-pattern symbol to an input sentence in advance, detect the symbol in doing the actual translation, and analyze the syntax of the input sentence based on the specified sentence pattern, thereby being able to more easily output an accurate translated equivalent.

Further, the specification of the sentence pattern results in reducing the syntax candidates to be analyzed. Hence, the translation machine has an advantage that the processing time is made shorter.

It is a third object of the present invention to provide a translation machine which can automatically set the dictionary-consulting mode to an optimal mode considering the characters of the input sentence.

The third object of the present invention can be achieved by a translation machine having a storing unit for storing information of words and grammar rules, the translation machine being capable of translating sentences described in a source language into a target language includes a unit for dividing input sentence described in the source language into morphologic elements, a unit connected to the dividing unit for analyzing a syntax of the morphologic elements in accordance with the information stored in the storing unit, a unit connected to the analyzing unit for converting a structure of the syntax obtained in the analyzing unit into a structure of syntax in the target language, a unit connected to the converting unit for generating a translated sentence based on the target language syntax structure obtained by the converting unit, and a unit connected to the generating unit for moduling the translated sentence so that translated sentence is compared with the input sentence.

Preferably, the moduling unit is capable of inclusively checking the input sentence described in the source language, the inclusively checking including a step of dividing the input sentence into words, a step of checking the word having two or more parts of the speech from the words, and a step of inserting a mark to the detected word.

More preferably, the moduling unit is capable or removing an ambiguity from the input sentence, the ambiguity removing including a step of detecting the mark-inserted word, a step of obtaining the two or more parts of the speech indicated by the mark, a step of displaying the two or more parts of the speech as candidates so as to specify a proper one of the candidates, and a step of replacing the mark with a symbol for indicating the part of the speech specified by an operator.

Further preferably, the dividing unit includes a unit for determining whether or not an uppercase exists in character series of the morphologic elements, a unit for calculating a proportion of the morphologic elements having an uppercase, and a unit for setting a dictionary consulting mode from a standard mode to an uppercase mode in accordance with a result obtained by the character determining unit.

The setting unit is preferably adapted to set the dictionary consulting mode from the standard mode to an uppercase mode on a basis of the proportion calculated by the calculating unit.

The setting unit is further preferably capable of converting the uppercase at the word head into a lowercase at the standard mode before consulting the dictionaries.

The setting unit is more preferably capable of converting all the uppercases contained in the word into the lowercases at the uppercase mode before consulting the dictionaries.

The translation machine designed according to the third aspect of the invention works as follows.

When the sentence is input to the dividing unit, it is divided into the morphologic element series. Then, the character determining unit determines whether or not an uppercase exists in all the morphologic elements (words). If yes, the rate calculating unit serves to calculate a percentage of morphologic elements which have an uppercase in the input sentence. Depending on the result given by the character determining unit and the percentage given by the rate calculating unit, the dictionary-consulting mode is automatically switched from the standard mode to the uppercase mode or vice versa. Based on the switchable dictionary-consulting mode, the translated equivalent to the morphologic element and its part of speech are obtained.

Next, the syntax analyzing unit serves to analyze the syntax of the morphologic element series. And, the converting unit converts the source-language syntax structure into the target-language one. Then, the translated equivalent generating unit generates the translated equivalent based on the target-language syntax structure.

The dividing unit performs the dictionary-consulting operation at the optimal mode set according to the morphology of the characters composing the input sentence. When the input sentence contains uppercases, the dictionary-consulting mode is automatically switched to the uppercase mode in a case that the percentage is equal to or more than a predetermined value.

The translation machine can analyze the input sentence containing many uppercases except the input sentence having an upper case placed at the head of the input sentence at a time when the morphologic elements of the input sentence are registered in the dictionaries. When the input sentence contains few uppercases such as a proper noun rarely appearing therein, the translation machine can output the original word as its translated equivalent without erroneously translating it.

Further objects and advantages of the present invention will be apparent from the following description of the preferred embodiments of the invention as illustrated in the accompanying drawings.

BRIEF DESCRIPTION OF THE DRAWINGS

FIG. 6 is a view showing a process of displaying part-of-speech candidates on a CRT;

FIG. 7 is a view showing a process of inserting a part-of-speech symbol into a sentence;

DESCRIPTION OF THE PREFERRED EMBODIMENTS

Hereinafter, a first embodiment of the invention will be described with reference to FIGS. 1 to 11.

Figure 1:
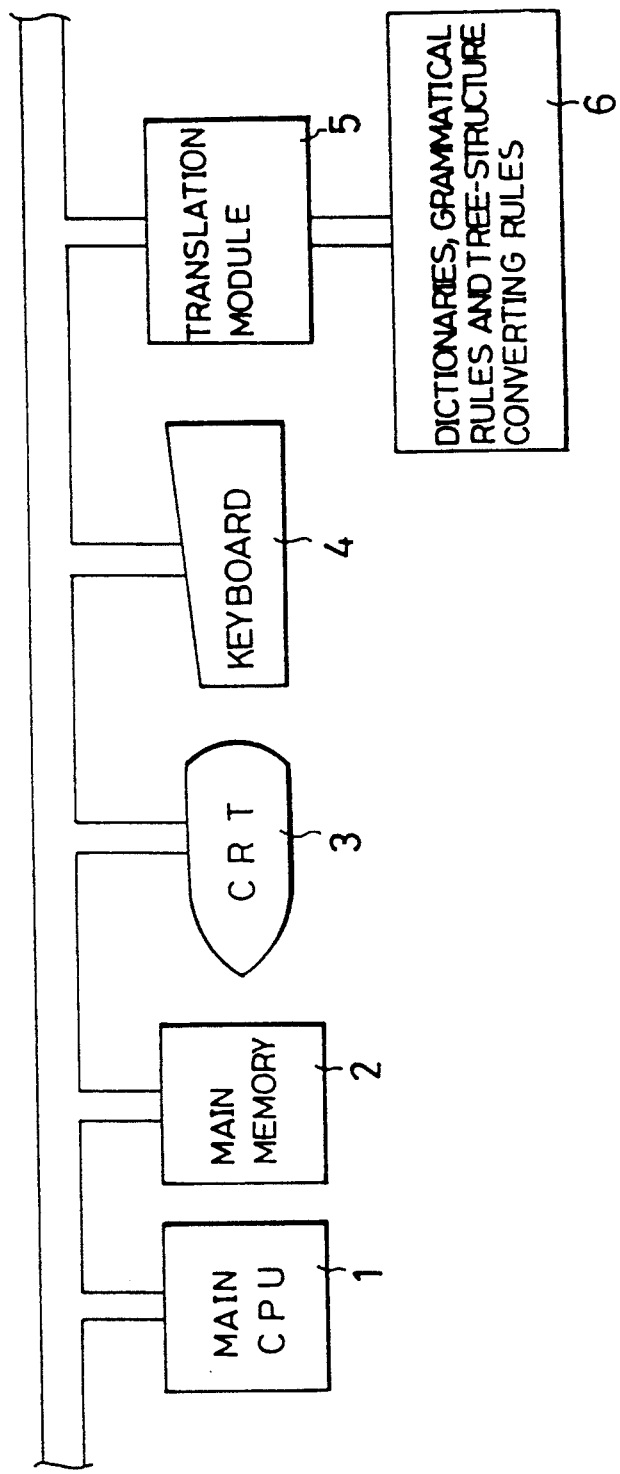
FIG. 1 is a block diagram showing a translation machine according to a first embodiment of the present invention.

FIG. 1 is a block diagram showing arrangement of a translation machine according to the first embodiment. 1 denotes a main CPU, 2 denotes a main memory, 3 denotes a CRT (Cathode-Ray Tube), 4 denotes a keyboard, 5 denotes a translation module, 6 denotes a memory storing translation dictionaries such as a main dictionary and a user dictionary, grammatical rules and tree-structure converting rules, and 7 denotes a printer for printing the translated result on paper.

The translation module 5 serves to translate a sentence described in a source language (English in this embodiment) into a target-language (Japanese) sentence and outputs the resulting sentence. That is, the source language is input from the keyboard 4 and is sent to the translation module 5 under the control of the main CPU 1. The translation module 5 translates the source language into the target language using the dictionaries, the grammatical rules and the tree-structure converting rules stored in the memory 6. A process of translation executed in the translation module 5 will be described later. The translated result is temporarily stored in the main memory 2 and displayed on the CRT 3. If an operator checks that the translated result displayed on the CRT 3 is proper and indicates it, the printer 7 serves to print the result on paper.

Figure 2:
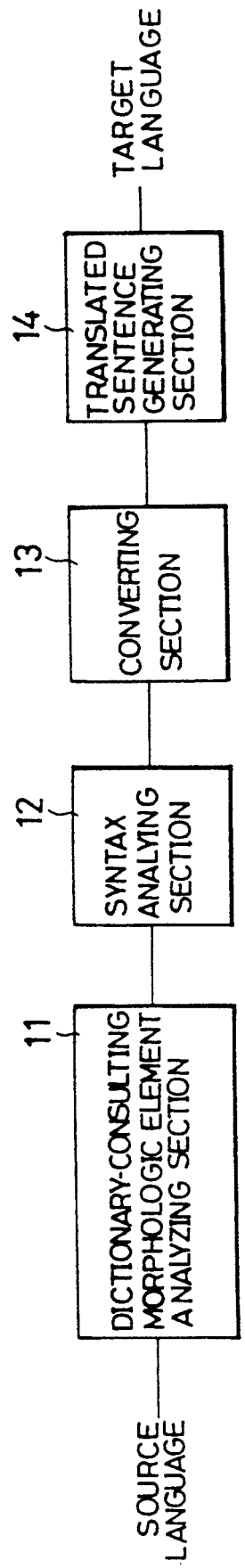
FIG. 2 is a block diagram showing a translation module included in the translation machine shown in FIG. 1.

FIG. 2 is a block diagram showing the translation module 5. As shown, the translation module 5 includes a dictionary-consulting morphologic element analyzing section 11, a syntax analyzing section 12, a converting section 13, and a translated sentence generating section 14. The translation module 5 further includes various buffers A, B, C and D (not shown) which are used for the translating process.

In the following part, a process of translation executed in the translation module 5 will be described with reference to FIGS. 1 and 2.

At first, the input sentence is stored in the buffer A (not shown). Then, the dictionary-consulting morphologic element analyzing section 11 divides the input sentence into morphologic element series (words). By consulting the dictionaries stored in the memory 6, the grammatical information and the translated equivalent are obtained and stored in the buffer C (not shown). Each word is further analyzed for obtaining the information such as a tense, a person and a numeral. Such process is referred to as morphologic element analysis based on the dictionary consulting. Next, the syntax analyzing section 12 serves to define a structure-analyzing tree showing a relation of the words in accordance with the dictionaries and the grammatical rules stored in the memory 6. This process is referred to as syntax analysis. The converting section 13 serves to convert the syntax-analyzing tree structure of the input sentence into the target-language syntax. And, the translated sentence generating section 14 serves to add a proper particle and an auxiliary verb to the converted syntax, thereby providing a proper translated sentence. The resulting translated sentence is output from the translation module 5 and is printed on paper by the printer 7.

Before the foregoing analysis, this translation machine has a function of inclusively checking the input sentence for detecting an ambiguous portion of the sentence considering the interpretation and for adding a mark. This is referred to as inclusive checking of the input sentence, which will be described in detail. Then, the machine has another function of removing the ambiguity from the portion having the mark added thereto. This is referred to as ambiguity removal, which will be described in detail.

Figure 3:
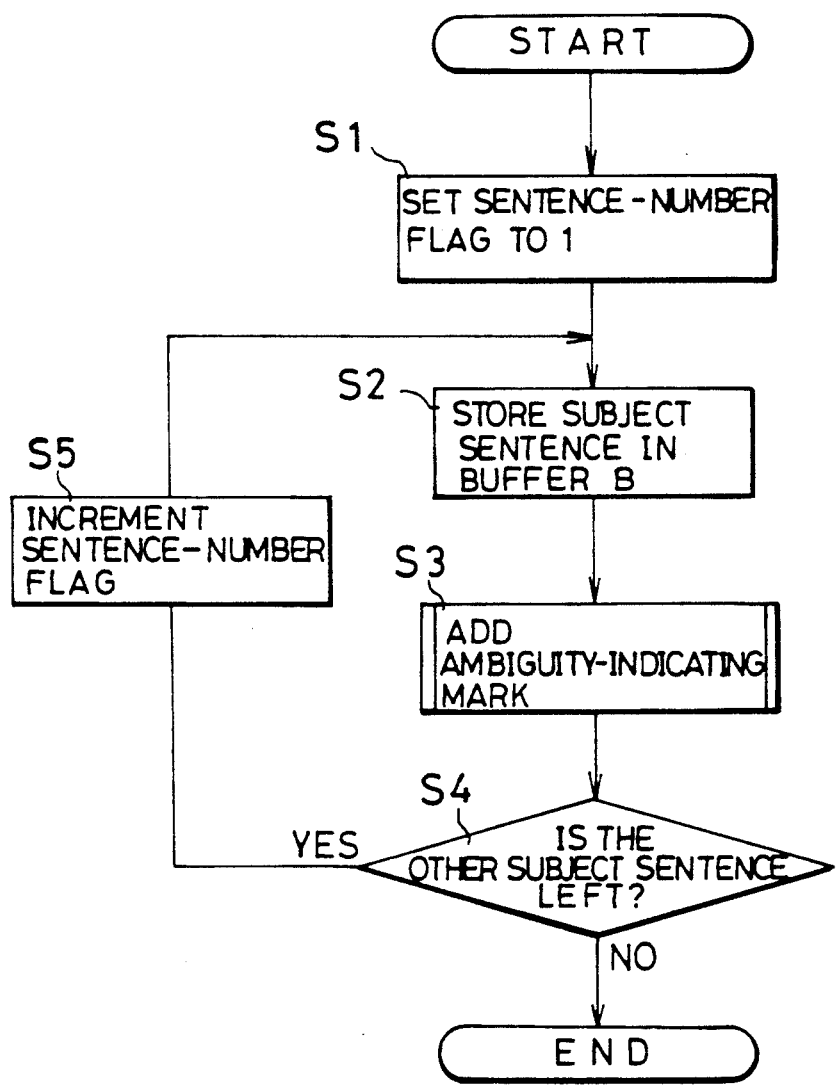
FIG. 3 is a flowchart showing a process of performing the inclusive checking of an original text by the translation module shown in FIG. 2.

FIG. 3 is a flowchart showing a process of executing the inclusive checking of the input sentence in the dictionary-consulting morphologic element analyzing section 11 included in the translation module 5. Herein, the description will be directed to the inclusive checking operation with reference to FIG. 3.

The inclusive checking operation starts by pressing "a function key for inclusively checking an input sentence". At this time, the buffer A has already stored one or more sentences composing the input sentence having sentence numbers added to each sentence.

At a step S1, "1" is set to a sentence-number-indicating flag (referred to as a sentence-number flag) representing a number of the currently processed sentence for initialization.

At a step S2, the sentence having the corresponding sentence-number flag is read out of the buffer A and then is stored in the buffer B.

At a step S3, an ambiguity-indicating mark (referred to an ambiguity mark) is added to "to-be-ambiguously-interpreted words" composing the sentence stored in the buffer B.

At a step S4, it is determined whether or not the buffer A still stores an unprocessed sentence based on the sentence number. If the buffer A still stores the unprocessed sentence, the process goes to a step S5 and, if the buffer A no longer stores the unprocessed sentence, the process if terminated.

At the step S5, the process increments the sentence-number flag and returns to the step S2.

Figure 4:
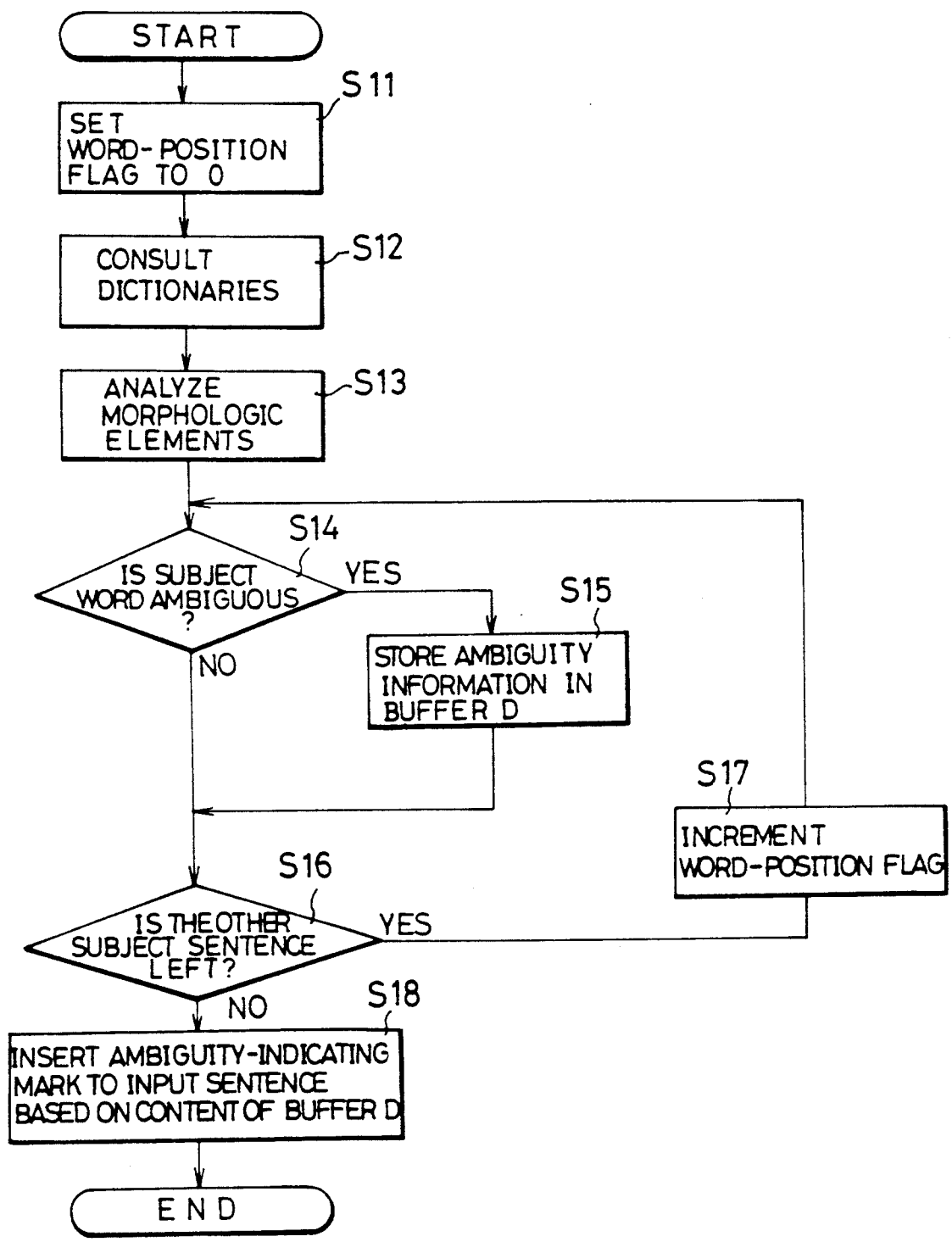
FIG. 4 is a flowchart showing a process of adding the ambiguity-indicating mark to a word by the translation module shown in FIG. 2.

FIG. 4 is a flowchart showing a process of adding the ambiguity mark to the proper word, which is executed at the step S3 of the flowchart shown in FIG. 3. In the following, the process of adding the ambiguity mark is described.

At a step S11, a word position flag is initialized to zero. The word position flag represents a number of the currently-processed word.

At a step S12, the dictionaries are consulted for each word composing the sentence.

At a step S13, the analysis of the morphologic elements is carried out on the dictionary-consulting result given at the step S12. It results in dividing the character series composing the sentence word by word. Then, the morphologic element information such as a part of speech of each divided word is stored in the buffer C with the word position number added to each word. If a word has two or more parts of speech, the information such as two or more parts of speech for the word is stored.

At a step S14, it is checked if the word marching to the word position flag is ambiguously interpreted. That is, by referring the content of the buffer C, it is checked if the word marching to the word-position flag has two or more parts of speech. If the word can be ambiguously interpreted (that is, has two or more parts of speech), the process goes to a step S15 and, if not, to a step S16.

At the step S15, the process obtains ambiguity information representing that the word is to be ambiguously interpreted and stores it in the buffer D. The ambiguity information consists of the word-position number and an ambiguity value representing the content of ambiguity.

At the step S16, it is checked if the next to-be-checked word is left in the sentence based on the word-position number. If the next word is left, the process goes to a step S17 and, if not, to a step S18.

At the step S18, the checking of ambiguity is finished for each of the words composing the sentence. Then, the content is stored in the buffer D. An ambiguity mark given depending on the ambiguity value is added to the word matching to the word-position number read out of the buffer D. As mentioned above, the word is included in the sentence stored in the memory B. It results in generating a mark-inserted sentence, thereby rewriting the content of the buffer B. And, the content of the rewritten buffer B is copied to the corresponding sentence number address in the buffer A. This is a finish of an ambiguity-mark-inserting process.

As described above, before analyzing the syntax, the inclusive checking of the ambiguous portions are automatically carried out for the input text while the morphologic elements are analyzed by consulting the dictionaries. Since the operator does not need to operate the translation machine, the operator can do another job. Further, all the ambiguous portions in the input sentence are allowed to be detected in advance. It results in being able to inclusively remove the ambiguity contained in the input text without doing a trial and error, which will be discussed below.

Figure 5:
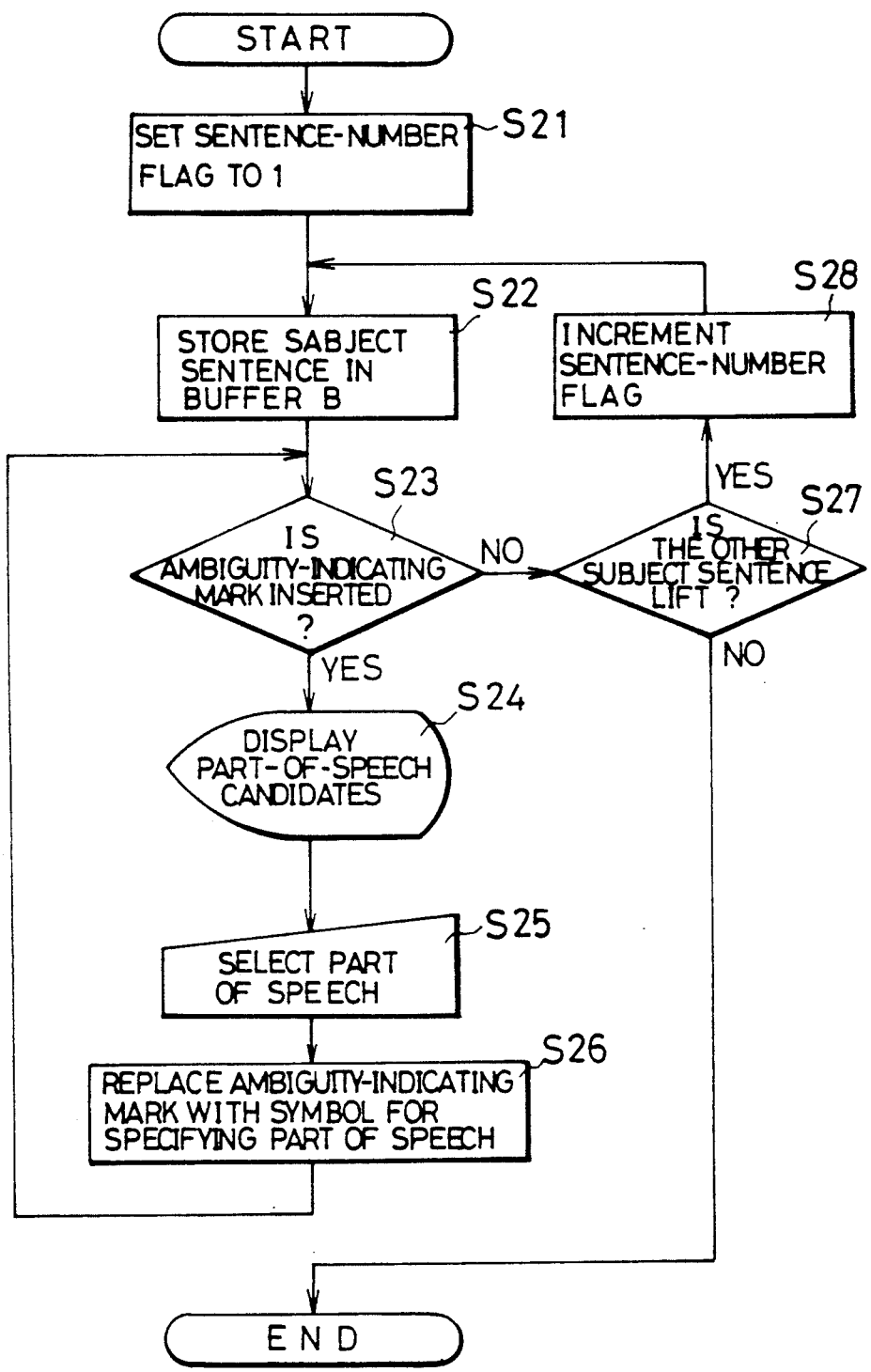
FIG. 5 is a flowchart showing a process of removing the ambiguity from a word the translation module shown in FIG. 2.

FIG. 5 is a flowchart showing a process of removing an ambiguity in the dictionary consulting and morphologic element analyzing section 11 included in the translation module 5. In the following, the process of removing the ambiguity will be described with reference to FIG. 5.

The ambiguity-removing process starts by pressing an "ambiguity-removing function key" provided in the keyboard shown in FIG. 1. This process continues interactively with an operator.

At a step S21, the sentence-number flag is initialized by setting "1" thereto.

At a step S22, the sentence-number matching to the sentence-number flag is read out of the buffer A and then is stored in the buffer B.

At a step S23, it is checked if the ambiguity mark is added in the sentence read at the step S22. If yes, the process goes to a step S24 and, if not, to a step S27.

At the step S24, the process takes the step of generating part-of-speech candidates for the word having the ambiguity mark. The part candidates are displayed on the CRT 3.

At a step S25, the operator selects the most suitable part of speech among the part candidates displayed at the step S24 and inputs it on the keyboard 4.

At the step S26, based on the part of speech selected by the operator at the step S25, the ambiguity mark added to the word of the sentence stored in the buffer B is replaced with a part-of-speech-specifying symbol (referred to as a part-of-speech symbol) for specifying the selected symbol, which will be discussed later. It results in rewriting the content of the buffer B. The rewritten content of the buffer B is copied to the corresponding sentence-number position in the buffer A.

At a step S27, it is checked if an unprocessed sentence is left in the buffer A. If yes, the process goes to a step S28 and if not, the process is terminated.

At the step S28, the process increments the sentence-number flag and returns to the step S22.

As described above, before analyzing the syntax, the present embodiment is designed to continuously remove the to-be-ambiguously-interpreted portions in the input sentence without a trial and an error. Hence, it makes possible to remove the portions to be ambiguously interpreted from the input sentence more efficiently.

Next, in the translation from English to Japanese, the inclusive original-text checking and the ambiguity-removing process will be described in more detail.

Tables 1 to 7 show the contents of the buffers A, B, C, and D provided when the inclusive original-text checking and ambiguity-removing process are done for the input English sentence of "The implementation of manufacturing strategies". In the following, the processes of the inclusive checking and ambiguity-removing of the input sentence will be described with reference to Tables 1 to 7.

As mentioned above, as shown in Table 1, the buffer A stores the input English sentences with the sentence numbers added thereto.

TABLE 1

| 1 | The importance of strategies. [NEW LINE] |
| 2 | The implementation of manufacturing strategies. [NEW LINE] |
| 3 | |

At first, the inclusive checking process starts with "2" being set to the sentence-number flag. At that time, the English sentence "The implementation of manufacturing strategies" matching to the sentence number "2" is read out of the buffer A and then is stored in the buffer B as shown in Table 3. Then, the ambiguity-mark-adding process starts. In this process, the morphologic elements composing "The implementation of manufacturing strategies" are analyzed by consulting the dictionaries stored in the memory 6 shown in FIG. 1.

Each divided word is stored in the buffer C stores each divided word with its part of speech, its morphologic element information (it contains the numeral, the word formation and so forth. It is displayed in brackets after the part of speech) and its word position number. The word position number "3" matches to the word "manufacturing" which has two parts of speech, that is, a verb and a noun. Hence, the part of speech "verb" is stored in the column of the part of speech 1, while the part of speech "noun" is stored in the column of the part of speech 2.

TABLE 2

| 1 | The importance of strategies. [NEW LINE] |
| 2 | The implementation of *170—manufacturing strategies [NEW LINE] |
| 3 | |

Like the word "manufacturing", if the word includes two or more parts of speech and has two functions (it does not necessarily have both functions) as the noun "verb" in the English sentence, the continuation of the translating process results in the word being ambiguously interpreted. Concretely, the English sentence of "The implementation of manufacturing strategies" can be interpreted in three manners.

TABLE 3

The implementation of manufacturing strategies [NEW LINE]

" (seizou-senryaku-no-jikkou)"

The part of speech of "manufacturing" is determined as a noun.

" (senryaku-o-seizou-surukotono-jikkou)"

The part of speech of "manufacturing" is determined as a verb (gerund).

" (seizou-siteiru-sennryaku-no-jikkou)"

The part of speech of "manufacturing" is determined as a verb (present particle, that is, adjective).

TABLE 4

The implementation of *170—manufacturing strategies [NEW LINE]

To remove the interpretative ambiguity in the sentence, the process retrieves a word having two or more parts of speech or a word to which a word-form information (for example, the present participle) is added from the sentence stored in the buffer C shown in Table 5. As shown, the word placed at the word position number "3" has both parts of speech, that is, "verb [present participle]" and "noun (singular)" and the word-form information "[present participle]". The word-form information added after the part of speech "verb" represents this word has a suffix [-ing]. To record that the word placed at the word-position number "3" is ambiguous considering an interpretation, as shown in Table 7, the buffer D saves the ambiguity information consists of the word-position number and the ambiguity value.

TABLE 5

| NO | TITLE | PART OF SPEECH (1) | PART OF SPEECH (2) |
|---|---|---|---|
| 0 | the | DEFINITIVE ARTICLE | |
| 1 | implementation | NOUN [SINGULAR] | |

TABLE 5-continued

| NO | TITLE | PART OF SPEECH (1) | PART OF SPEECH (2) |
|---|---|---|---|
| 2 | of | PREPOSITION | |
| 3 | manufacturing | GERUND [PRESENT PARTICIPLE] | NOUN [SINGULAR] |
| 4 | strategies | NOUN [PLURAL] | |

The ambiguity value represents a kind of ambiguity the word has. The ambiguity value is expressed compact in hexadecimal number so that it may be directly added to the ambiguous word in the input English sentence stored in the buffer A. In the following, a process of expressing the ambiguity value in hexadecimal number will be described.

TABLE 6

| NO | TITLE | PART OF SPEECH (1) | PART OF SPEECH (2) |
|---|---|---|---|
| 0 | the | DEFINITIVE ARTICLE | |
| 1 | implementation | NOUN [SINGULAR] | |
| 2 | of | PREPOSITION | |
| 3 | manufacturing | NOUN [SINGULAR] | |
| 4 | strategies | NOUN [PLURAL] | |

The grammatical part of speech to which the ambiguous word belongs is divided into functional parts depending on how it functions in the English sentence and each part of speech has a hexadecimal number assigned thereto as shown in Table 8. The grammatical part of speech is called as a first part of speech. The divided functional part of speech is called as a second part of speech.

The second part of speech "verb" shown in Table 8 indicates all the roles of the verb in any English sentence. Hence, a hexadecimal number assigned to the second part of speech "verb" consists of addition of two or more of hexadecimal numbers respectively assigned to "verb (basic form)", "verb (third person, singular, present)":, "verb (past)", "verb (past participle)", "verb (present participle)", "verb (gerund)", and "verb (adjective use)".

In the English sentence stored in the buffer C shown in Table 5, the word "manufacturing" at the word position number "3" is detected to have both the first parts of speech "verb [present participle]" and "noun [singular]". The verb with [-ing] represented as the first part of speech "verb [present participle]" can be divided into three second parts of speech "verb (present participle)", "verb (gerund)", and "verb (adjective use)". It means that the word "manufacturing" has "verb (present participle)", "verb (gerund)", and "verb (adjective use)" as the second part of noun.

The ambiguity value of the word "manufacturing" is, therefore, represented as "0170", which is a result of adding a hexadecimal number "0010" assigned to "verb (present participle)", a hexadecimal "0020" assigned to "verb (gerund)", a hexadecimal number "0040" assigned to "verb (adjective use)" and a hexadecimal number "0100" assigned to "noun". Then, the buffer D saves the ambiguity information consisting of the word position number "3" and the ambiguous value "0170" as shown in Table 7.

TABLE 7

| WORD POSITION | AMBIGUITY VALUE |
|---|---|
| 3 | 0170 |

TABLE 8

| HEXA-DECIMAL NO. | SECOND PART OF SPEECH | PART-OF-SPEECH SYMBOL |
|---|---|---|
| 007f | VERB | v_ |
| 0001 | VERB (BASIC FORM) | ve_ |
| 0002 | VERB (THIRD PERSON, SINGULAR, PRESENT) | v_ |
| 0004 | VERB (PAST) | vk_ |
| 0008 | VERB (PAST PARTICIPLE) | vb_ |
| 0010 | VERB (PRESENT PARTICIPLE) | vg_ |
| 0020 | VERB (GERUND) | vd_ |
| 0040 | VERB (ADJECTIVE USE/ADJECTIVE) | a_ |
| 0080 | ADVERB | d_ |
| 0100 | NOUN | n_ |

As set forth above, the ambiguity value of the word having two or more second parts of speech is represented by an adding result of the hexadecimal values assigned to those second parts of speech. When a hexadecimal number is assigned to the second part of speech, the assigned hexadecimal number is not permitted to be the adding result of any combination of the hexadecimal values assigned to the other second parts of speech.

The ambiguity mark representing the ambiguity value "0170" is then inserted immediately before the word "manufacturing" placed at the word position number "3" included in the English sentence "The implementation of manufacturing strategies" stored in the buffer B. It is shown in Table 4. The ambiguity mark consists of symbols "*" and "_" and an ambiguity value located therebetween in order to allow the hexadecimal number representing the ambiguity value to be distinguished if a number exists in the input English sentence.

TABLE 9

| (a) | v1_ | FIRST SENTENCE PATTERN | (SV) |
| (b) | v2_ | SECOND SENTENCE PATTERN | (SVC) |
| (c) | v3_ | THIRD SENTENCE PATTERN | (SVO) |
| (d) | v4_ | FOURTH SENTENCE PATTERN | (SVOO) |
| (e) | v5_ | FIFTH SENTENCE PATTERN | (SVOC) |

Then, the sentence, to which the ambiguity mark "*170$_{13}$" is inserted, is copied from the buffer B into the same sentence-number position of the buffer A as shown in Table 2. Similarly, the sentence-number flag is incremented so that the inclusive checking process of the input sentence starts for the English sentence at the next sentence number. As shown in Table 1, the checking process is executed serially for the English sentences stored in the buffer A until the last one.

In turn, it is assumed that "2" is set to the sentence number flag as soon as the ambiguity-removing process starts. At this time, the buffer A has already stored the changed content as shown in Table 2. Hence, the mark-inserted sentence "The implementation of *170_manufacturing strategies." Located at the sentence number "2" is read out of the buffer A and then is stored in the buffer B. Then, it is checked if the mark-inserted sentence has an ambiguity mark. In this case, the mark-inserted sentence located at the sentence number "2" has the ambiguity mark "*170_", the location of which indicates that the word "manufacturing" has two or more second parts of speech. As a result, the process starts for displaying the second part-of-speech candidates of the word "manufacturing", which will be described later.

At first, the ambiguity value "0170" represented by the ambiguity mark "*170_" is divided into the hexadecimal numbers assigned to the second parts of speech. Those numbers are shown in Table 8. In the dividing operation, since the ambiguity value "0170" contains "1" at the third column, it indicates that the value has the hexadecimal number assigned to the second part of speech "noun (0100)" (because the ambiguity value can contain "1" at the third column only if the ambiguity value has the hexadecimal number assigned to the second part of speech "noun"). The separation of the second part "noun" from the ambiguity value "070" results in yielding the ambiguity value "0070" containing "7" at the second column. It indicates that the other second part of speech is "verb" or "adjective" (because the contention of "adverb (0080)" yields the ambiguity value having 8 or more at the second column). Since the ambiguity value "0070" contains "0" at the first column, it indicates that the word does not have "verb (basic form) (0001)", "verb (third person, singular, present) (0002)", "verb (past) (0004)" and "verb (past participle) (0008)". That is, the second part of speech except "noun" is any one of "verb (present participle)", "verb (gerund)" and "verb (adjective use)/adjective". It results in the hexadecimal number "0070" being divided into "verb (present principle) (0010)", "verb (gerund) (0020)" and "verb (adjective use)/adjective (0040)", because the addition of these three second parts of speech results in yielding the ambiguity value "0070".

Finally, as shown in FIG. 6, the resulting second parts of speech, that is, "verb", "verb (present participle)", "verb (gerund)", "gerund (adjective use)/adjective), and "noun" are displayed as the second speech part-of-speech candidates in a window on the CRT 3 on which the mark-inserted sentence is displayed.

By referencing the second part-of-speech candidates and the mark-inserted sentence displayed on the CRT 3, the operator can select the most suitable candidate to the sentence on the keyboard 4. In this embodiment, "noun" is selected as the most suitable second part of speech of the word "manufacturing".

Then, the ambiguity mark "*170_" inserted into the English sentence stored in the buffer B is replaced with a part-of-speech symbol "n_" for the second part of speech "noun" with reference to Table 8. The resulting sentence, that is, the sentence with the symbol inserted therein is copied from the buffer B to the same sentence number location of the buffer A. It results in changing the screen to that shown in FIG. 7. It indicates that the English sentence "The implementation of n_manufacturing strategies" is located at the sentence number "2". Further, as shown in Table 6, from the word position number "3" of the buffer C is deleted the first part of speech "verb [present participle]", resulting in the buffer C storing only the first part of speech "noun singular]". Hereinafter, likewise, the sentence-number flag is incremented so that the ambiguity-removing process starts for the mark-inserted sentence located at the next sentence number. As shown in Table 2, the process is executed in sequence for the mark-inserted sentences stored in the buffer A until the last one.

The ambiguity-removing process results in uniquely defining the second part of speech of the word "manufacturing" as "noun" to obtain the proper translated equivalent to the input English sentence "The implementation of n_manufacturing strategies", it is only necessary to keep the sentence post-processed in the syntax analyzing section 12, the converting section 13 and the translated sentence generating section 14.

As set forth above, according to the present embodiment, the dictionary consulting and morphologic element analyzing section 11 included in the translation module 5 divides the input English sentence into the words for the purpose of obtaining the first part of speech of each word and the morphologic-element information. Before analyzing the syntax in the syntax analyzing section 12, based on the first part of speech and the morphologic-element information, it is inclusively and automatically checked if each divided word has interpretative ambiguity (that is, has two or more second parts of speech). If yes, the ambiguity mark is added to the word in the input English word for representing two or more second parts of speech, resulting in generating the mark-inserted sentence.

Next, the ambiguity-mark-added word is retrieved in the mark-inserted sentence. And, the ambiguity value of the mark is reduced into two or more second parts of speech, which are displayed as the candidates on the CRT 3. The operator selects the most suitable one among the candidates (that is, removes the ambiguity). After the operator specifies the second part of speech, the part-of-speech symbol matching to the specified part of speech is replaced with the ambiguity mark added to the word, thereby generating the sentence with the part-of-speech symbol inserted therein. The later translating process is executed for the sentence.

In other words, before analyzing the syntax, the inclusive input text checking and the ambiguity-removing process are executed for the input sentence for inclusively removing the ambiguity from the input sentence. Hence, an operator can remove the ambiguity in the input sentence for a quite short time so that the later translating process can progress efficiently.

The above description has indicated that the ambiguity mark added to the input sentence includes an ambiguity value as a main component and the ambiguity value is expressed in the addition of the hexadecimal numbers respectively assigned to two or more second parts of speech. The invention, however, is not limited to it. In essence, any mark may be used only if it can properly represent two or more second parts of speech of the ambiguous word and may be directly inserted in the input sentence.

The above description has indicated that the dictionary consulting and morphologic element analyzing process offers the first part of speech and then the second part of speech is obtained on the former one. The invention, however, is not limited to it. It may be designed so that the dictionary consulting and morphologic element analyzing process can directly offer the second part of speech.

The inclusive original-text checking and ambiguity removing algorithms are not limited to those of the foregoing embodiment.

Further, the arrangement and the content of the translation module 5 are not limited to those of the present embodiment.

It goes without saying that the source language and the target one are not limited to English and Japanese, though the above embodiment has been described on that assumption.

The arrangement of the second embodiment is substantially same as that of the first embodiment. Hence, see FIGS. 1 and 2 with respect to the arrangement of the second embodiment. The feature of this embodiment is focused on a symbol for specifying a sentence pattern (for short, sentence-pattern symbol) and the sentence patterns itself stored in the memory 6, which are the main topics of the later description.

At first, with reference to Tables 9 and 10, the sentence pattern symbols and the sentence patterns are described. As shown in Table 9, a sentence pattern (a) consists of a subject (S) and a verb (V), a sentence pattern (b) consists of a subject (S), a verb (V) and a complement (C), a sentence pattern (c) consists of a subject (S), a verb (V) and an object (O), a sentence pattern (d) consists of a subject (S), a verb (V), a first object (O) and a second object (O), and a sentence pattern (e) consists of a subject (S), a verb (V), an object (O) and a complement (C).

The memory 6 shown in FIG. 1 stores the grammatical rules (a) to (p) shown in Table 10, which will be described later.

TABLE 10

| | | | |
|---|---|---|---|
| (a) | SENTENCE | → | NOUN PHRASE + VERB PHRASE |
| (b) | NOUN PHRASE | → | ADJECTIVE + NOUN |
| (c) | NOUN PHRASE | → | NOUN |
| (d) | NOUN PHRASE | → | DEFINITIVE + NOUN + NOUN |
| (e) | VERB PHRASE | → | VERB 1 |
| (f) | VERB PHRASE | → | VERB 2 + ADJECTIVE PHRASE |
| (g) | VERB PHRASE | → | VERB 3 + NOUN PHRASE |
| (h) | VERB PHRASE | → | VERB 4 + NOUN PHRASE + NOUN PHRASE |
| (i) | VERB PHRASE | → | VERB 5 + NOUN PHRASE + NOUN PHRASE |
| (j) | VERB PHRASE | → | VERB 5 + NOUN PHRASE + NOUN PHRASE |
| (k) | VERB 1 | → | VERB <SENTENCE PATTERN 1> |
| (l) | VERB 2 | → | VERB <SENTENCE PATTERN 2> |
| (m) | VERB 3 | → | VERB <SENTENCE PATTERN 3> |
| (n) | VERB 4 | → | VERB <SENTENCE PATTERN 4> |
| (o) | VERB 5 | → | VERB <SENTENCE PATTERN 5> |
| (p) | ADJECTIVE PHRASE | → | ADJECTIVE |

The grammatical rule (a) indicates that a sentence consists of a noun phrase and a verb phrase. The grammatical rule (b) indicates that the noun phrase consists of a definitive and a noun. The grammatical rule (c) indicates that the noun phrase consists of a noun. The grammatical rule (d) indicates that the noun phrase consists of a definitive and two nouns. The grammatical rule (e) indicates that a verb phrase consists of a verb 1. The grammatical rule (f) indicates that a verb phrase consists of a verb 2 and an adjective. The grammatical rule (g) indicates that a verb phrase consists of a verb 3 and a noun phrase. The grammatical rule (h) indicates that a verb phrase consists of a verb 3 and a noun phrase. The grammatical rule (i) indicates that a verb phrase consists of a verb 5, a noun phrase and a verb phrase. The grammatical rule (k) indicates that the verb 1 matches to a sentence pattern 1. The grammatical rule (l) indicates that the verb 2 matches to a sentence pattern 2. The grammatical rule (m) indicates that the verb 3 matches to a sentence pattern 3. The grammatical rule (n) indicates that the verb 4 matches to a sentence pattern 4. The grammatical rule (o) indicates that the verb 5 matches to a sentence pattern 5. The grammatical rule (p) indicates that the adjective phrase consists of an adjective.

Next, the processes of adding and deleting sentence-pattern symbol inserted in the input sentence, which are executed in the dictionary consulting and morphologic element analyzing section 11, will be described with references to FIGS. 2 and 8.

Figure 8:
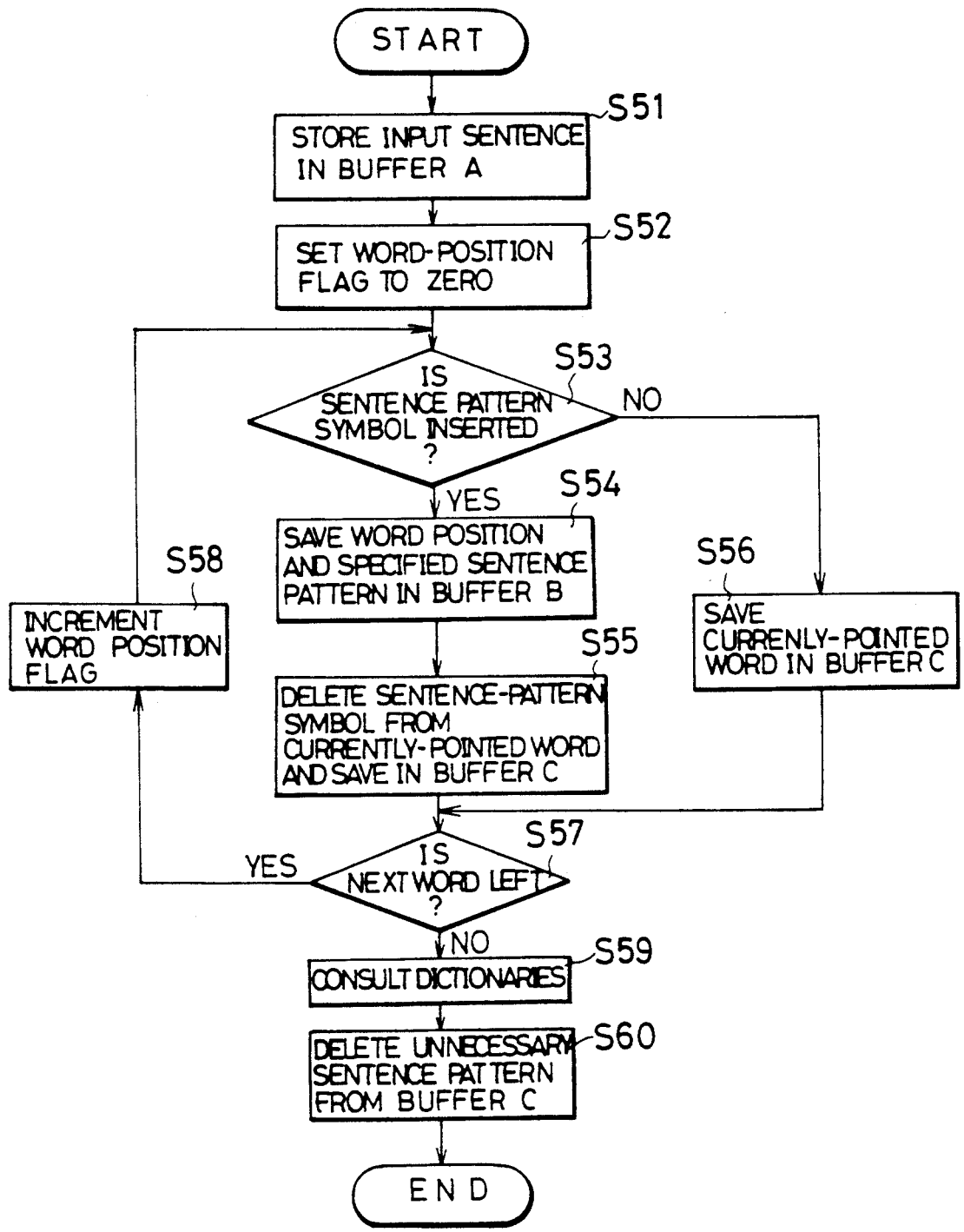
FIG. 8 is a flowchart showing processes of adding and deleting a sentence-pattern symbol form a word by the translation module in the second embodiment.

FIG. 8 is a flowchart showing processes of adding and deleting a sentence-pattern symbol in the present embodiment.

At a step S51, the buffer A included in the section 11 stores an input sentence "The system v3_makes the support function." with the sentence-pattern symbol "v3_" being inserted therein (see Table 11).

TABLE 11

| |
|---|
| The system v3_makes the support function. |

At a step S52, a word-position flag (that is, a pointer) is set to 0 so that it points the head word "The".

At a step S53, it is checked whether or not the head of the currently-pointed word is a sentence-pattern symbol. If not, the process goes to a step S56 at which the buffer C saves the word and its word position (see Table 13). At a step S57, it is checked whether or not the next word is left in the input sentence. If yes, the process goes to a step S58 at which the word-position flag is incremented by one and returns to the step S53 from which the similar process is carried out. It results in the buffer C storing "the system" of the input sentence. Again, proceeding to the step S53, it is checked that the currently-pointed word "v3_makes" has the sentence-pattern symbol at its head. Then, proceeding to the step S54, the buffer B stores the word position "2" and the number of the specified sentence pattern "3" (see Table 12). And, at the step S55, the sentence-pattern symbol is deleted from the word "makes" and is saved in the buffer C. Again, the process goes to the step S57 at which it is checked if the next word is left in the input sentence.

TABLE 12

| WORD POSITION No. | SENTENCE PATTERN |
|---|---|
| 2 | 3 |

The process from the steps S53 to S58 is repeated until the buffer stores the whole sentence. Then, the process goes from the step S57 to the step S59 at which the dictionaries are consulted for the title words stored in the buffer C so that the part of speech and the sentence pattern for each title word can be stored in the buffer C (see Table 13).

TABLE 13

| WORD POSITION | TITLE | PART OF SPEECH 1 | SENTENCE PATTERN 1 | PART OF SPEECH 2 | SENTENCE PATTERN 2 |
|---|---|---|---|---|---|
| 0 | the | ARTICLE | | | |
| 1 | system | NOUN | | | |
| 2 | makes | VERB | 3/5 | | |
| 3 | the | ARTICLE | | | |
| 4 | support | VERB | 3 | NOUN | |
| 5 | function | VERB | 1 | NOUN | |

At a step S60, in the buffer C, all the sentence pattern Nos. except the sentence pattern No. stored in the buffer B are deleted from the sentence pattern Nos. for the word placed at the word position stored in the buffer B.

The buffer C has stored the sentence patterns 3 and 5 for the word "makes" at the word position 2. Since the buffer B stores the sentence pattern 3 for the word, the other sentence pattern 5 is deleted from the buffer C. It results in the sentence pattern stored in the buffer C being 3. Table 14 shows the final content of the buffer C.

TABLE 14

| WORD POSITION | TITLE | PART OF SPEECH 1 | SENTENCE PATTERN 1 | PART OF SPEECH 2 | SENTENCE PATTERN 2 |
|---|---|---|---|---|---|
| 0 | the | ARTICLE | | | |
| 1 | system | NOUN | | | |
| 2 | makes | VERB | 3 | | |
| 3 | the | ARTICLE | | | |
| 4 | support | VERB | 3 | NOUN | |
| 5 | function | VERB | 1 | NOUN | |

Next, a process in the syntax analyzing section 12 (see FIG. 2) is described.

The syntax analyzing section 12 creates a syntax-structure tree based on the information about a part of speech for each word stored in the buffer C. Herein, since the verb "makes" matches to the sentence pattern 3, the grammatical rule (m) shown in Table 10 is applied for creating the syntax-structure tree as shown in FIG. 11.

Then, the converting section 13 converts the input sentence into a target-language (Japanese) syntax. And, the translated-sentence generating section 14 serves to generate the translated equivalents to the words composing the input sentence based on the created syntax structure. At the final stage, the translation module outputs the translated sentence of " ".

If, on the other hand, no sentence-pattern symbol is added to the word "makes", the word "makes" has two sentence patterns 3 and 5 so as to bring about the application of the grammatical rules (a) and (o) shown in Table 10. It results in outputting three syntax-analyzing structures shown in FIGS. 9 to 11.

Figure 9:
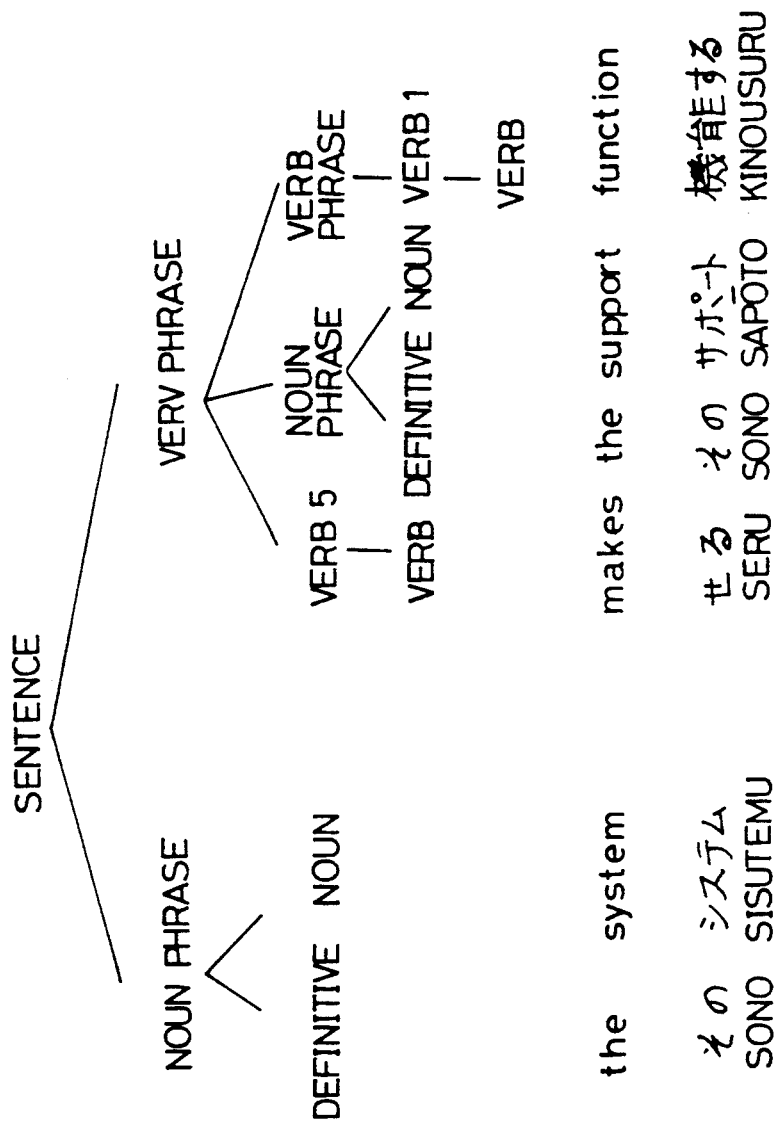
FIGS. 9 to 11 are views showing syntax-analyzing trees output by the syntax analyzing section included in the second embodiment of the invention.
Figure 10:
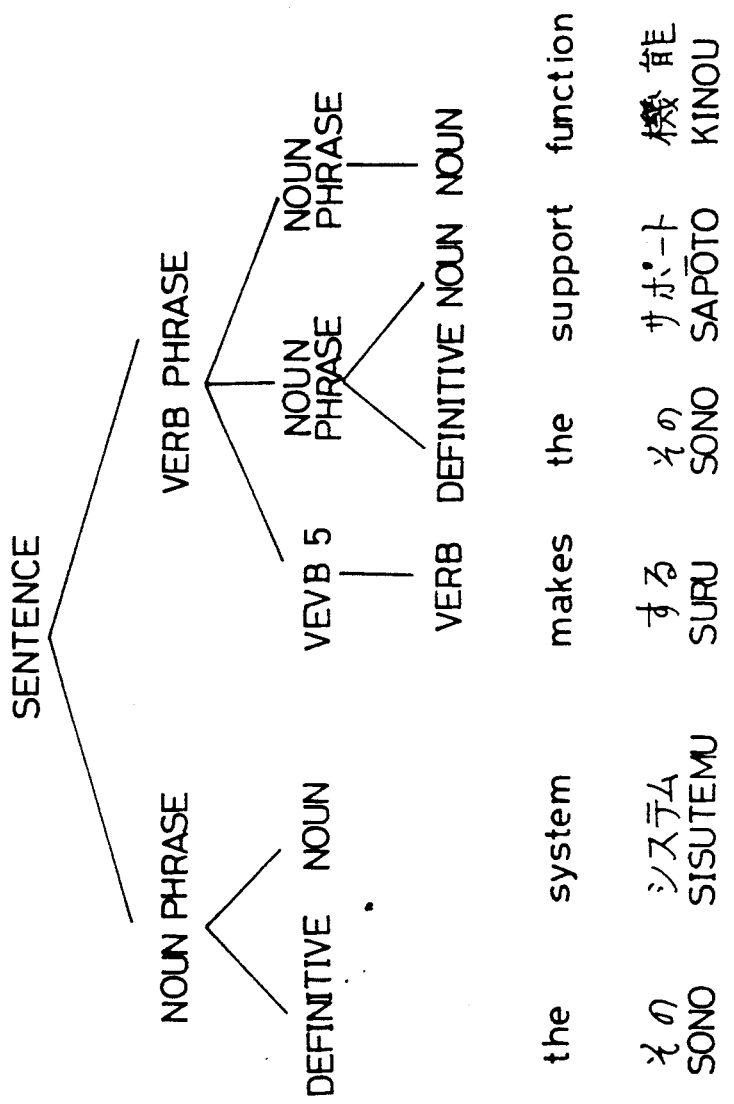
Figure 11:
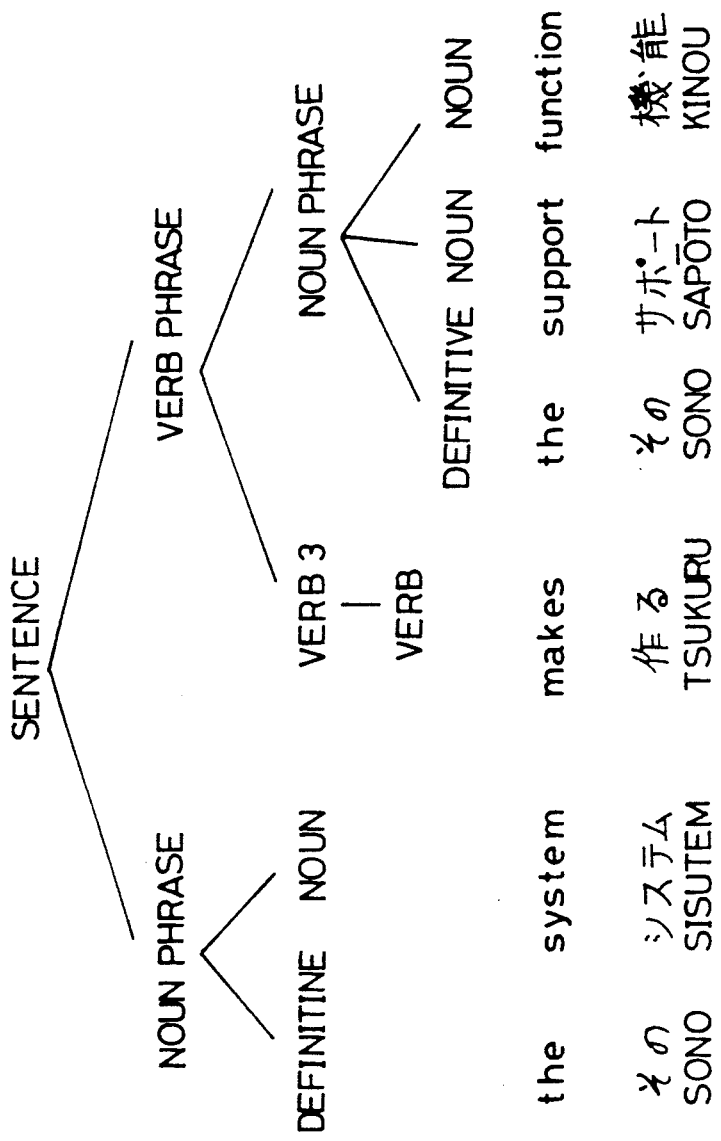

These three translated outputs are " ", shown in FIG. 9, " "shown in FIG. 10, and " " shown in FIG. 11.

As described above, the translation machine according to the present embodiment is designed to insert the sentence-pattern symbol to the word "makes" so that only (m) of the grammatical rules (m) and (o) is allowed to apply to the word. It means that the syntax-analyzing result is an output shown in FIG. 11. That is, the proper translated output " " can be easily obtained.

Figure 12:
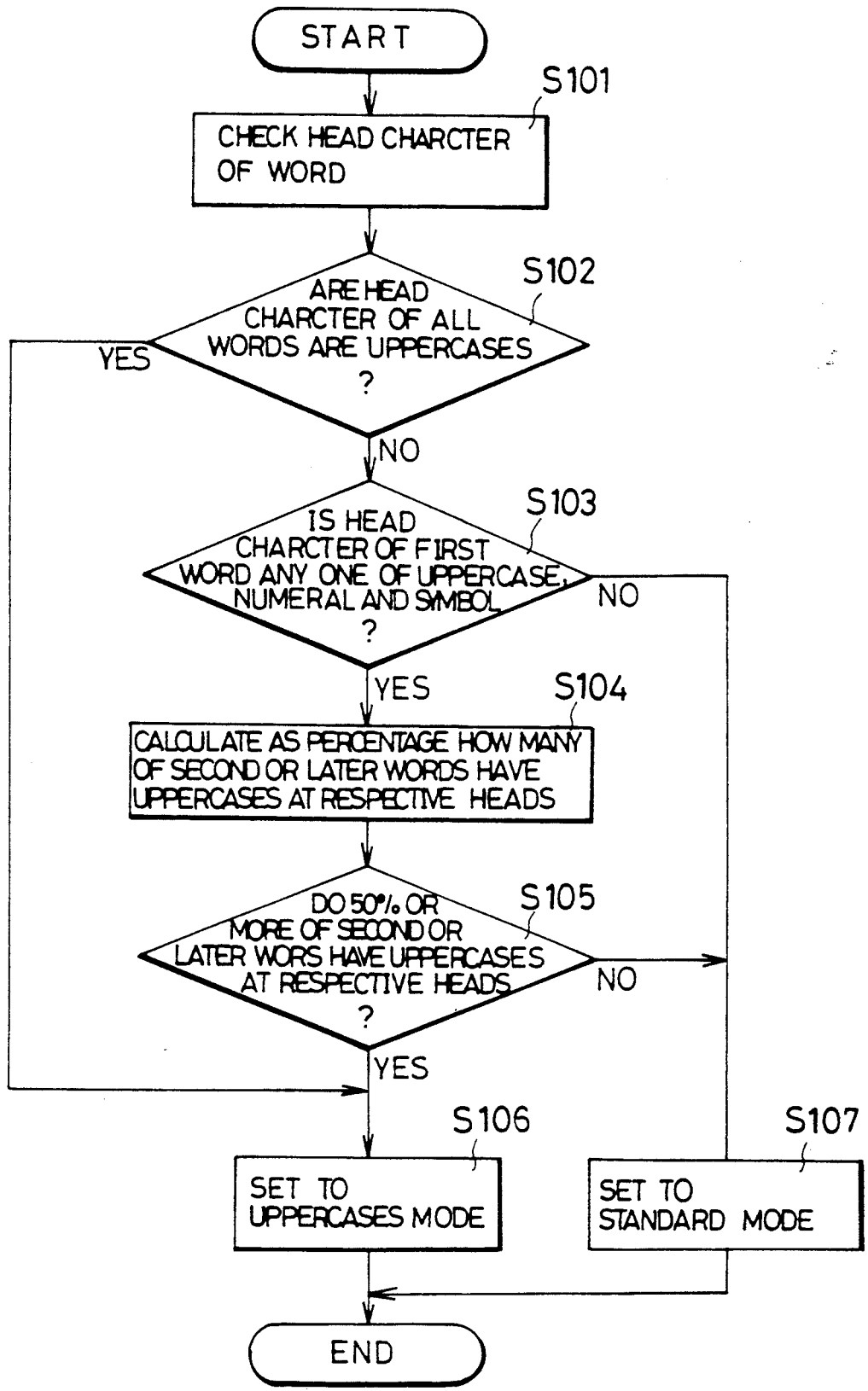
FIG. 12 is a flowchart showing a process of setting a dictionary-consulting mode in a third embodiment of the invention.

In turn, the description will be directed to the third embodiment with reference to FIG. 12.

The arrangement of the third embodiment is substantially same as that of the first embodiment. Hence, see FIGS. 1 and 2 with respect to the arrangement of the third embodiment. The feature of this embodiment is focused on a process of setting the dictionary-consulting mode executed when the dictionary consulting and morphologic element analyzing section 11 works. The later description, therefore, will be directed to the feature.

FIG. 12 is a flowchart showing the process of setting the dictionary-consulting mode executed when the dictionary consulting and morphologic element analyzing section 11 works. The manner of setting the dictionary-consulting mode will be described with reference to FIG. 12.

At a step S101, the head character of each word included in the input sentence is checked.

At a step S102, it is checked whether or not each word has an uppercase at the head based on the result given at the step S101. If yes, the process skips to a step S106 and if not, to a step S103.

At the step S103, it is checked if the head character of the first word (head word) of the input sentence is any one of an uppercase, a numeral and a symbol. If yes, the process goes to a step S104 and if not, to a step S107.

At the step S104, it is calculated as a percentage how many words of the text have uppercases at the respective word heads.

At a step S105, it is checked if the percentage calculated at the step S104 is 50% or more. If yes, the process goes to a step S106 and if not, to the step S107.

At the step S106, if all the words of the text have uppercases at their respective heads or if the head character of the first word is any one of an uppercase, a numeral and a symbol and 50% or more of the subsequent words have uppercases at their respective heads, it is determined that the majority of the words have uppercases at their respective heads. Thus, the dictionary-consulting mode is automatically switched to an uppercase mode.

At the uppercase mode, therefore, all the uppercases included in the words are converted into lowercases before consulting the dictionaries. It means that the dictionaries are properly consulted for all the words including the uppercases, which occupies a majority of words composing the text as mentioned above. It results in allowing the morphologic element analyzing section 11 (see FIG. 2) to properly analyze the text into the morphologic elements (words) only if they are registered in the dictionaries.

At a step S107, if the head character of the first word is any one except the uppercase, the numeral and the symbol (that is, it is a lowercase) or if the head character of the first word is an uppercase, a numeral or a symbol and 50% or more of the subsequent words have lowercases at their respective heads, it is determined that a majority of the words have lowercases at their respective heads. Hence, the dictionary-consulting mode is automatically switched to a standard mode.

At the standard mode, therefore, only the head character of the first word is converted to a lowercase before consulting the dictionaries. When consulting the dictionaries, a special word having an uppercase at its head such as a proper noun rarely appearing in the text keeps its head character intact without converting it to the lowercase. Hence, such a word is output straight as its translated equivalent without being erroneously translated.

Herein, the description will be directed to the step S105, that is, why the second or subsequent words of the sentence are checked if they have uppercases at their respective heads without checking the first word of the sentence. This is because the head of each sentence often corresponds to the title and the head character of the first word of each sentence of ten has a numeral such as "1" or a symbol such as "$" accordingly.

As described above, before the dictionary consulting and morphologic element analyzing section 11 performs the operation of consulting the dictionaries, the present embodiment is designed to check the head character of each word included in the input sentence and calculate a percentage of the second or subsequent words have uppercases at their respective heads. If all the words included in the text have uppercases at their respective heads or if the first word has any one of an uppercase, a numeral and a symbol at its head and 50% or more of the second or subsequent words have uppercases at their respective heads, the dictionary-consulting mode is automatically switched to the uppercase mode. If the first word included in the text has a lowercase at its head or if the first word has any one of an uppercase, a numeral and a symbol and 50% or more of the second or subsequent words have lowercases at their respective heads, the dictionary-consulting mode is automatically switched to the standard mode.

That is, if a majority of the words included in the input text have uppercases at their respective heads, the section 11 (see FIG. 2) serves to consult the dictionaries at the uppercase mode. Hence, if the word has an uppercase appearing at the position except the sentence head, it is subject to the analysis done by the section 11 if it is registered in the dictionaries. If, on the other hand, a majority of the words included in the input sentence have lowercases at their respective heads, the section 11 serves to consult the dictionaries at the standard mode. it results in allowing a proper noun rarely appearing in the sentence to be output straight as its translated equivalent without being erroneously translated.

It will be understood from the above description that the present embodiment can automatically set the dictionary-consulting mode to an optimal mode for more efficiently performing the translating process.

The above embodiment has been described so that various operations can be executed depending on the kind of the head character of each word, an uppercase or a lowercase. The present invention may employ another character of each word in addition to the head character.

The algorithm for setting the dictionary-consulting mode is not limited to the foregoing one.

It goes without saying that the source language and the target language may employ any language in principle, though the embodiment employs English and Japanese as these languages.

Many widely different embodiments of the present invention may be constructed without departing from the spirit and scope of the present invention. It should be understood that the present invention is not limited to the specific embodiments described in this specification, except as defined in the appended claims.

What is claimed is:

1. A translation machine having a storing unit for storing information of words and grammar rules, said translation machine being capable of translating sentences described in a source language into a target language, said translation machine comprising:

means for dividing an input sentence described in said source language into morphologic elements;

means connected to said dividing means for analyzing a syntax of said morphologic elements in accordance with said information stored in said storing unit;

means connected to said analyzing means for converting a structure of said syntax obtained in said analyzing means into a structure of syntax in said target language; and means connected to said converting means for generating a translated sentence based on said target language syntax structure obtained by said converting means, said dividing means including means for adding a symbol so as to specify a sentence pattern to a word included in said input sentence described in said source language, means for detecting whether or not said sentence pattern symbol is added in said input sentence during a translating operation, means for storing a word to which said symbol is added and a sentence pattern specified by said symbol at a time when said sentence pattern symbol is detected, and means for defining a structure of said input sentence by referring to a content of said storage means.

2. A translation machine having a storing unit for storing information of words and grammar rules, said translation machine being capable of translating sentences described in a source language into a target language, said translation machine comprising:

means for dividing an input sentence described in said source language into morphologic elements;

means connected to said dividing means for analyzing a syntax of said morphologic elements in accordance with said information stored in said storing unit;

means connected to said analyzing means for converting a structure of said syntax obtained in said analyzing means into a structure of syntax in said target language; and means connected to said converting means for generating a translated sentence based on said target language syntax structure obtained by said converting means, said sentence pattern detected by said symbol adding means being selected from any one of a first pattern sentence including a subject and a verb, a second pattern sentence including a subject, a verb and a complement, a third pattern sentence including a subject, a verb and an object, a fourth pattern sentence including a subject, a verb, a direct object and indirect object, and a fifth pattern sentence including a subject, a verb, an object and a complement.

3. A translation machine having a storing unit for storing information of words and grammar rules, said translation machine being capable of translating sentences described in a source language into a target language, said translation machine comprising:

means for dividing an input sentence described in said source language into morphologic elements;

means connected to said dividing means for analyzing a syntax of said morphologic elements in accordance with said information stored in said storing unit;

means connected to said analyzing means for converting a structure of said syntax obtained in said analyzing means into a structure of syntax in said target language; and means connected to said converting means for generating a translated sentence based on said target language syntax structure obtained by said converting means, said storing means being capable of storing grammatical rules regarding a plurality of sentence patterns which are selected in accordance with a result of said dividing means.

4. A translation machine according to claim 3, wherein said plurality of sentence patterns include a sentence including a noun phrase only, a sentence including a verb phase only, and a sentence including noun and verb phrases.

5. A translation machine according to claim 4, wherein said dividing means includes a means for determining whether or not an uppercase exists in character series of said morphologic elements, a means for calculating a proportion of said morphologic elements having an upper case, and a means for setting a dictionary consulting mode from a standard mode to an uppercase mode in accordance with a result obtained by said character determining means.

6. A translation machine according to claim 5, wherein said setting means is adapted to set said dictionary consulting mode from said standard mode to an uppercase mode on a basis of said proportion calculated by said calculating means.

7. A translation machine according to claim 6, wherein said setting means is capable of converting said uppercase at said word head into a lowercase at said standard mode before consulting said dictionaries.

8. A translation machine according to claim 7, wherein said setting means is capable of converting all said uppercases contained in said word into said lowercases at said uppercase mode before consulting said dictionaries.

9. A translation machine having a storing unit for storing information of words and grammar rules, said translation machine being capable of translating sentences described in a source language into a target language, said translation machine comprising:

means for dividing an input sentence described in said source language into morphologic elements;

means connected to said dividing means for analyzing a syntax of said morphologic elements in accordance with said information stored in said storing unit;

means connected to said analyzing means for converting a structure of said syntax obtained in said analyzing means into a structure of syntax in said target language;

means connected to said converting means for generating a translated sentence based on said target language syntax structure obtained by said converting means; and means connected to said generating means for moduling said translated sentence so that said translated sentence is compared with said input sentence, wherein said moduling means inclusively checks said input sentence described in said source language, said inclusively checking including dividing said input sentence into words, detecting a word having two or more parts of speech and inserting a mark in said detected word, said moduling means including means for removing an ambiguity from said input sentence, by detecting said mark-inserted word, obtaining said two or more parts of said speech indicated by said mark, displaying said two or more parts of said speech as candidates for specifying a proper one of said candidates by an operator and replacing said mark with a symbol for indicating said part of said speech specified by said operator.

* * * * *